United States Patent [19]
Kushida

[11] 3,841,347
[45] Oct. 15, 1974

[54] ROTARY VALVE

[76] Inventor: Kazuhiko Kushida, 2454, Tazima, Urawa, Japan

[22] Filed: Dec. 11, 1972

[21] Appl. No.: 314,007

[52] U.S. Cl. ................ 137/242, 251/172, 251/174
[51] Int. Cl. ............................................. F16k 5/08
[58] Field of Search ............... 251/172, 171, 174; 137/242, 243

[56] References Cited
UNITED STATES PATENTS

| | | | |
|---|---|---|---|
| 2,084,248 | 6/1937 | Ferrari | 137/242 X |
| 2,899,980 | 8/1959 | Loebel | 251/205 X |
| 3,014,690 | 12/1961 | Boteler | 251/174 |
| 3,036,600 | 5/1962 | Vickeny | 251/172 X |
| 3,350,056 | 10/1967 | Blumenkranz | 137/242 X |
| 3,477,691 | 11/1969 | Griswold | 251/172 |

Primary Examiner—Harold W. Weakley
Attorney, Agent, or Firm—Browning & Bushman

[57] ABSTRACT

A rotary valve having a stationary sealing plate operatively engaged with the outer surface of a rotatable valve element for providing a complete seal and for effecting a cutting action when impurities are caught in between the sealing plate and the valve element.

2 Claims, 4 Drawing Figures

ROTARY VALVE

A rotary valve is generally comprised of a spherical, hemispherical or other specially contoured valve element rotatably mounted in a valve chamber and a stationary plate having a circular opening adapted to engage with the outer surface of the valve element thereby providing a seal for the valve. However, when the rotary valve of this type is used to control the flow of fluid containing slurry, fibers or other impurities, such impurities are often caught in between the circular opening of the sealing plate and the outer surface of the valve element, causing leakage in the fluid passage of valve and obstructing the smooth operation of the valve element.

The present invention is to provide an improved valve for advantageously controlling the flow of fluid containing slurry, fibers or other impurities. According to the valve of the invention, the impurities that might be caught in between the sealing plate and valve element, are cut by the edge of the circular opening of the plate. Thus, the valve maintains complete sealing and smooth operation. The valve of the invention further provides an advantage that slight dimensional errors and wear in the operative parts of the valve are compensated by the provision of a special sealing plate.

The invention is now described in detail by way of an embodiment illustrated in the accompanying drawings, in which.

Figure 1:
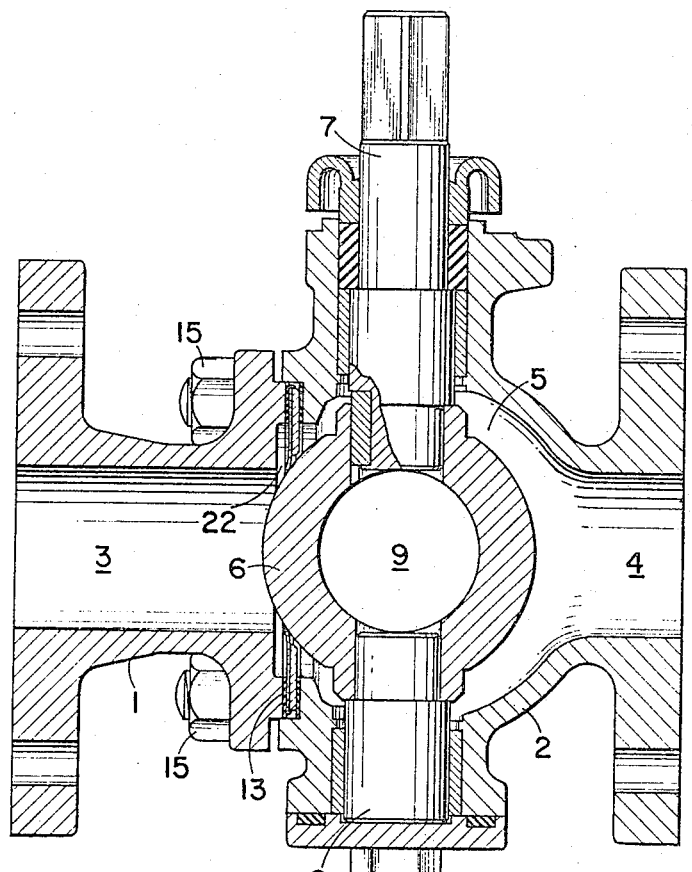
FIG. 1 is a vertical sectional view of a rotary valve according to the invention, with its ball plug rotated to completely close the valve.

Referring to the drawings, numeral 1 is applied to a flanged cylindrical member which forms a valve housing when assembled with a valve body 2. A fluid inlet 3 is formed in the valve housing member 1; and a fluid outlet 4 is formed in the valve body 2. The valve body 2 has a valve chamber 5 in which a valve element 6 is rotatably supported by a pair of vertical shafts 7 and 8. In the illustrated embodiment, the valve element 6 is a spherical ball plug having a horizontal fluid passage 9 which communicates with the fluid inlet 3 and outlet 4 when they are aligned, but this valve element may be in the form of hemispherical plug or a disc-like member.

The valve body 2 is machined to provide a cylindrical peripheral surface 10 which receives a cylindrical projection 11 of the housing member 1. Disposed between the projection 11 of member 1 and the abutting face 12 on the valve body 2 is a circular sealing plate 13 which is sandwiched by a pair of gasket rings 14 and fastened in position by bolts 15 which is adapted to secure the valve housing member 1 to the valve body 2.

Figures 2, 3, 4:
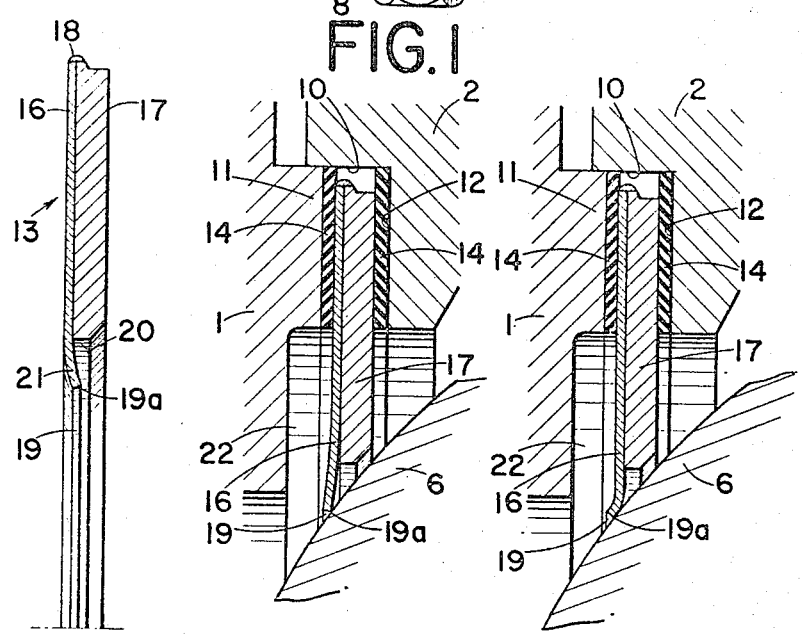
FIG. 2 is an enlarged fragmentary sectional view of a sealing plate before it is incorporated in the valve of FIG. 1.
FIG. 3 is an enlarged sectional detail showing the sealing plate of FIG. 2 incorporated in the valve of FIG. 1.
FIG. 4 is a view similar to FIG. 3 but showing the sealing plate under a high fluid pressure.

As shown especially in FIG. 2, the sealing plate 13 is composed of a thin elastic disc 16 made of a material having proper hardness and elasticity, such as for example stainless steel, and a relatively thicker disc 17 welded to each other at their outer peripheral edges 18. When the plate 13 is incorporated into the valve, the central opening 19 of the elastic disc 11 engages with the spherical outer surface of the ball plug 6 for providing a seal for the valve. Accordingly, the opening 20 in the rigid disc 17 has such a diameter that it does not engage with the ball plug 6.

As best seen in FIGS. 1, 3, and 4, the diameter of the sealing plate 13 as determined, by the outer peripheral edge 18, is somewhat less than the diameter of the cylindrical peripheral surface 10. The annular clearance between surface 10 and the edge 18 of sealing plate 13 allows the latter to move in a plane transverse to the flow axis of the valve. This, in effect, allows the sealing plate 13 to center itself with respect to the valve element 6 such that the opening 19 in the elastic disc 16 and the fluid passage 9 in the valve element 6 will be substantially coaxial when the valve is assembled.

The portion 21 in disc 16 which encircles the opening 19 is, when in its free state, slightly curved toward the rigid disc 17 as shown in FIG. 2. It should be further noted that the inner peripheral edge 19a of the opening 19 in the disc 16 is shaped to provide a cutting edge as will be described hereinafter again.

When the sealing plate 13 is incorporated in the assembled valve, there is formed an annular recess 22 between the valve housing member 1 and the elastic disc 11 of plate 13 at the upstream side of the valve, as shown in FIGS. 1 and 3, in such a manner that the recess 22 is communicated with the fluid inlet 3.

The rotary valve according to the present invention is substantially same in its operation as conventional valves of similar type, but the sealing plate 13 is so arranged that the peripheral edge 19a of the opening 19 in the elastic disc 16 will be always and strongly urged toward the outer peripheral surface of the ball plug 6 as shown in FIG. 3. This ensures a complete sealing when the valve is closed by turning the valve element 6. In the case that slurry, fibers and other impurities are caught in between the opening 19 of disc 16 and the outer surface of valve element 6, the turning operation of the valve element 6 will cause the edge 19a of opening 19 in the disc 16 to cut such impurities in association with the outer surface of the valve element 6. Thus there is little fear that the operation of valve be retarded or the sealing becomes imperfect due to the presence of such impurities in the fluid to be controlled.

Further, since the outer surface of the elastic disc 16 of the sealing plate 13 is arranged to receive the fluid pressure in the fluid inlet 3 via recess 22, the pressure developed in the upstream flow acts on the sealing plate 13 so as to create a strong sealing effect in the valve. Hence, the greater the fluid pressure, the stronger the urging force of the opening 19 of the sealing plate 13 against the valve element 6, as shown in FIG. 4, thus providing a greater sealing effect.

What is claimed is:

1. In a rotary valve, a sealing plate provided at the boundary between a valve chamber containing a rotatable valve element therein and a fluid inlet, said sealing plate comprising a relatively thin elastic disc member welded to a relatively thick, rigid disc member, both of said disc members having openings therein, the inner peripheral edge of said elastic disc member defining a circular opening having a cutting edge, said cutting edge engaging the outer surface of said valve element when said valve is closed, said elastic disc member being of a material having sufficient hardness to effect a cutting of fibers or the like between said cutting edge and said valve element.

2. A rotary valve comprising a valve body having a valve chamber therein, said valve body having an internal annularly extending recess providing a cylindrical surface, a valve element rotatably mounted within said valve chamber, a housing member providing a fluid inlet removably secured to said valve member, a sealing plate disposed within said annularly extending recess between said housing and said valve body, said sealing plate comprising a relatively thin elastic disc member welded to a relatively thick, rigid disc member, both of said disc members having openings therein, the inner peripheral edge of said elastic disc member defining a circular opening and having a cutting edge, said cutting edge engaging the outer surface of said valve element when said valve is closed, said elastic disc member being of a material having sufficient hardness to effect a cutting of fibers or the like between said cutting edge and said valve element, the outer diameter of said sealing plate being less than the diameter of said cylindrical surface whereby said sealing plate can be moved transversely to the flow axis of said valve to allow positioning of said sealing plate relative to said valve element.

* * * * *